US007871115B2

(12) United States Patent
Vitito et al.

(10) Patent No.: US 7,871,115 B2
(45) Date of Patent: Jan. 18, 2011

(54) VEHICLE ENTERTAINMENT SYSTEM WITH MOTORIZED HINGE

(75) Inventors: Christopher J. Vitito, Celebration, FL (US); Jeffrey D. Brawner, Tampa, FL (US)

(73) Assignee: Audiovox Corporation, Hauppauge, NY (US)

( * ) Notice: Subject to any disclaimer, the term of this patent is extended or adjusted under 35 U.S.C. 154(b) by 37 days.

(21) Appl. No.: 12/389,959

(22) Filed: Feb. 20, 2009

(65) Prior Publication Data

US 2009/0152417 A1 Jun. 18, 2009

Related U.S. Application Data

(63) Continuation-in-part of application No. 11/453,264, filed on Jun. 15, 2006, which is a continuation-in-part of application No. 11/177,405, filed on Jul. 11, 2005, now Pat. No. 7,604,273.

(60) Provisional application No. 60/690,874, filed on Jun. 16, 2005, provisional application No. 60/732,656, filed on Nov. 3, 2005, provisional application No. 60/778,362, filed on Mar. 3, 2006.

(51) Int. Cl.
*B60R 7/00* (2006.01)

(52) U.S. Cl. .................. 296/37.8; 248/917; 348/837

(58) Field of Classification Search ........... 296/37.8; 224/311; 248/917–924; 348/837; 361/681
See application file for complete search history.

(56) References Cited

U.S. PATENT DOCUMENTS

| 5,096,271 A | 3/1992 | Portman |
| 5,173,686 A | 12/1992 | Fujihara |
| 5,467,106 A | 11/1995 | Salomon |
| 5,847,685 A | 12/1998 | Otsuki |
| 6,256,078 B1 | 7/2001 | Ogata |

(Continued)

FOREIGN PATENT DOCUMENTS

JP 04-368245 6/1991

(Continued)

*Primary Examiner*—Lori L Lyjak
(74) *Attorney, Agent, or Firm*—F. Chau & Associates, LLC

(57) ABSTRACT

A video system for selective mounting within a cradle secured to a ceiling of an automobile includes a video housing in which a video monitor and a video source are mounted and a base secured to the video housing in a manner that permits rotation of the video housing. The video housing includes a mounting bracket and the base includes a mounting bracket for use in pivotally coupling the video housing to the base. A motorized first hinge connects the base to the video housing for facilitating pivotal movement between the video housing and the base between a use position and a storage position, the first hinge includes a pivot pin having a first end and a second end and extends between, and is coupled to, the mounting bracket of the video housing and the mounting bracket of the base, the second end of the pivot pin is fixedly coupled to the mounting bracket of the base. The drive motor assembly is mounted to the video housing. The drive motor assembly includes a drive shaft having a distal end secured to a distal tip at the first end of the pivot pin permitting rotational motion to be imparted by the drive motor assembly to be transfer to the video housing.

17 Claims, 12 Drawing Sheets

U.S. PATENT DOCUMENTS

| | | |
|---|---|---|
| 6,292,236 B1 * | 9/2001 | Rosen ................. 224/311 |
| 6,443,574 B1 | 9/2002 | Howell et al. |
| 6,445,573 B1 | 9/2002 | Portman et al. |
| 6,529,123 B1 | 3/2003 | Paul, Jr. |
| 6,647,819 B1 | 11/2003 | Chang |
| 6,663,155 B1 | 12/2003 | Malone et al. |
| 6,711,003 B2 | 3/2004 | Nakasuna |
| 6,724,317 B1 | 4/2004 | Kitano et al. |
| 6,816,177 B2 | 11/2004 | Wang et al. |
| 7,239,101 B2 | 7/2007 | Choi |
| 2002/0149708 A1 | 10/2002 | Nagata et al. |
| 2003/0005639 A1 * | 1/2003 | Kowalczyk ................. 49/340 |

FOREIGN PATENT DOCUMENTS

| | | |
|---|---|---|
| JP | 05-185878 | 1/1992 |

* cited by examiner

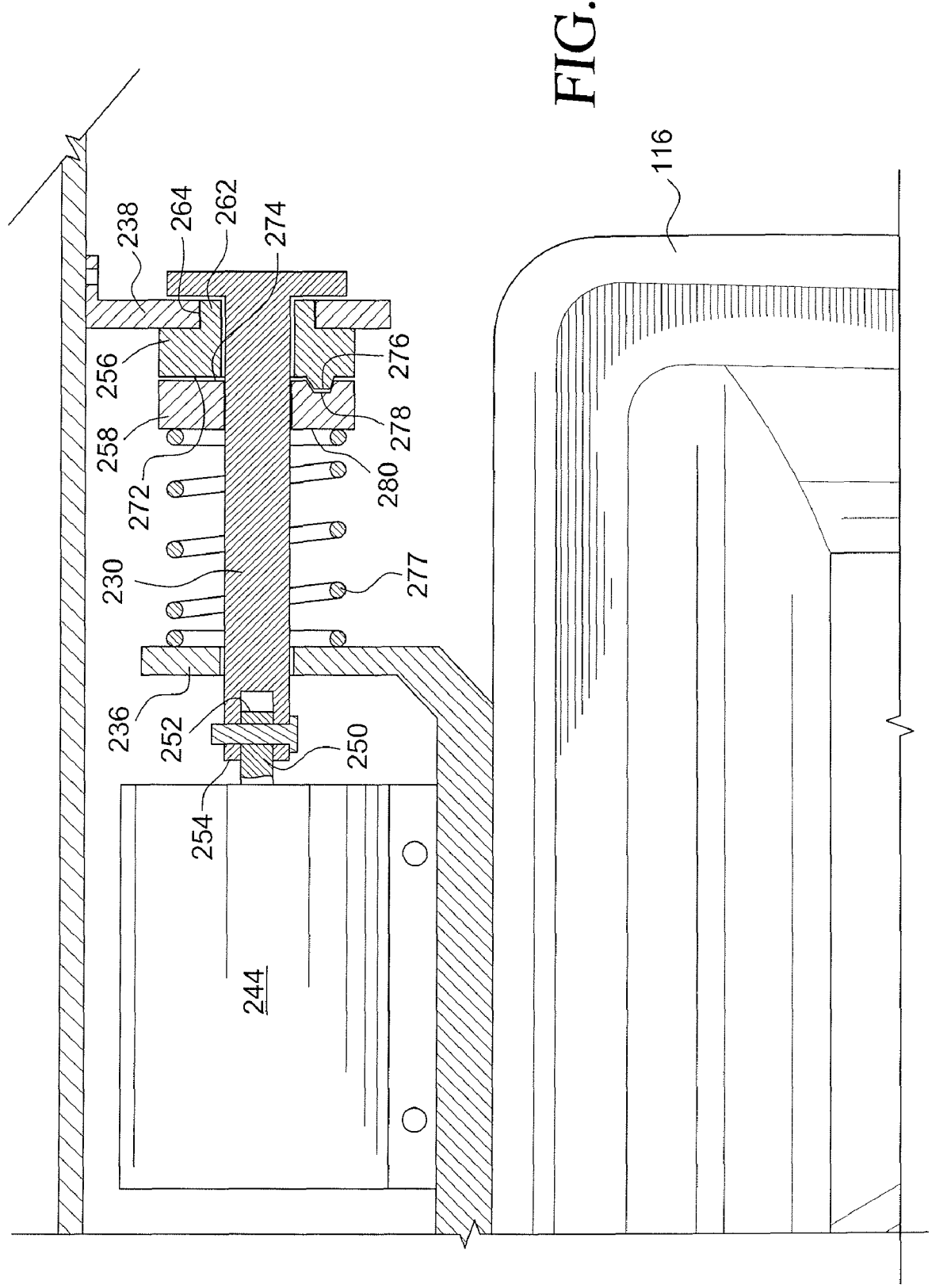

VEHICLE ENTERTAINMENT SYSTEM WITH MOTORIZED HINGE

CROSS REFERENCE TO RELATED APPLICATIONS

This application is a continuation-in-part of U.S. patent application Ser. No. 11/453,264, filed Jun. 15, 2006, entitled "Vehicle Entertainment System with Flush Supporting Cradle", which is currently pending, which is a continuation-in-part of U.S. patent application Ser. No. 11/177,405, filed Jul. 11, 2005, now U.S. Pat. No. 7,604,273 entitled "Vehicle Entertainment System" and which claims the benefit of U.S. Provision Application Ser. No. 60/690,874, filed Jun. 16, 2005, entitled "Vehicle Entertainment System"; and U.S. patent application Ser. No. 11/453,264 claims the benefit of U.S. Provisional Patent Application Ser. No. 60/732,656, filed Nov. 3, 2005, entitled "Vehicle Entertainment System", and U.S. Provisional Patent Application Ser. No. 60/778,362, filed Mar. 3, 2006, entitled "Vehicle Entertainment System".

BACKGROUND OF THE INVENTION

1. Field of the Invention

The invention relates to mobile entertainment systems. More particularly, the invention relates to a motorized hinge assembly for an overhead mobile entertainment system.

2. Description of the Prior Art

Entertainment systems for automobiles are well known. As such, many advances have been made in the development of entertainment systems that make the otherwise tedious task of riding in an automobile more bearable. In addition to the development of overhead systems pioneered by the present inventor, systems that mount at various locations within an automobile have also been developed.

These entertainment systems allow multiple individuals to view a variety of different video sources within the same vehicle. However, and as those skilled in the art will certainly appreciate, it is desirable to provide added versatility to these entertainment systems. The present invention attempts to accomplish this by providing a system whereby the video system may be selectively removed from a mounting structure within an automobile and used at other locations.

SUMMARY OF THE INVENTION

It is, therefore, an object of the present invention to provide a video system for selective mounting within a cradle secured to a ceiling of an automobile. The video system includes a video housing in which a video monitor and a video source are mounted and a base secured to the video housing in a manner that permits rotation of the video housing. The video housing includes a mounting bracket and the base includes a mounting bracket for use in pivotally coupling the video housing to the base. A motorized first hinge connects the base to the video housing for facilitating pivotal movement between the video housing and the base between a use position and a storage position, the first hinge includes a pivot pin having a first end and a second end and extends between, and is coupled to, the mounting bracket of the video housing and the mounting bracket of the base, the second end of the pivot pin is fixedly coupled to the mounting bracket of the base. The drive motor assembly is mounted to the video housing. The drive motor assembly includes a drive shaft having a distal end secured to a distal tip at the first end of the pivot pin permitting rotational motion to be imparted by the drive motor assembly to be transfer to the video housing.

It is also an object of the present invention to provide a video system wherein the pivot pin is fixedly coupled to the mounting bracket of the base via a break-away clutch assembly.

It is another object of the present invention to provide a video system wherein the break-away clutch assembly includes a base clutch member fixedly connected to the mounting bracket of the base and a monitor clutch member fixedly connected to the pivot pin and the drive shaft of the motor.

It is a further object of the present invention to provide a video system wherein the base clutch member is fixedly connected to the mounting bracket of the base by a projection that seats within an aperture formed in the mounting bracket, such that when the projection is seated with the aperture the base clutch member is prevented from rotation relative to the mounting bracket and the base.

It is also an object of the present invention to provide a video system wherein the base clutch member also includes a circular bearing aperture shaped and dimensioned for the passage of the pivot pin therethrough in a manner allowing for free rotation of the pivot pin relative thereto.

It is another object of the present invention to provide a video system wherein the monitor clutch member, which is selectively, fixedly connected to the base clutch member, includes an aperture shape and dimensioned for passage of the pivot pin therethrough in a manner which locks the monitor clutch member to the pivot pin for rotation therewith.

It is a further object of the present invention to provide a video system wherein the drive motor assembly includes a housing in which a motor is supported for moving the video housing relative to the base, the motor includes the drive shaft.

Other objects, advantages and salient features of the invention will become apparent from the following detailed description, which taken in conjunction with the annexed drawings, discloses a preferred, but non-limiting, embodiment of the subject invention.

BRIEF DESCRIPTION OF THE DRAWINGS

FIG. 7 is a cross sectional view of the hinge structure utilized in accordance with the present invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
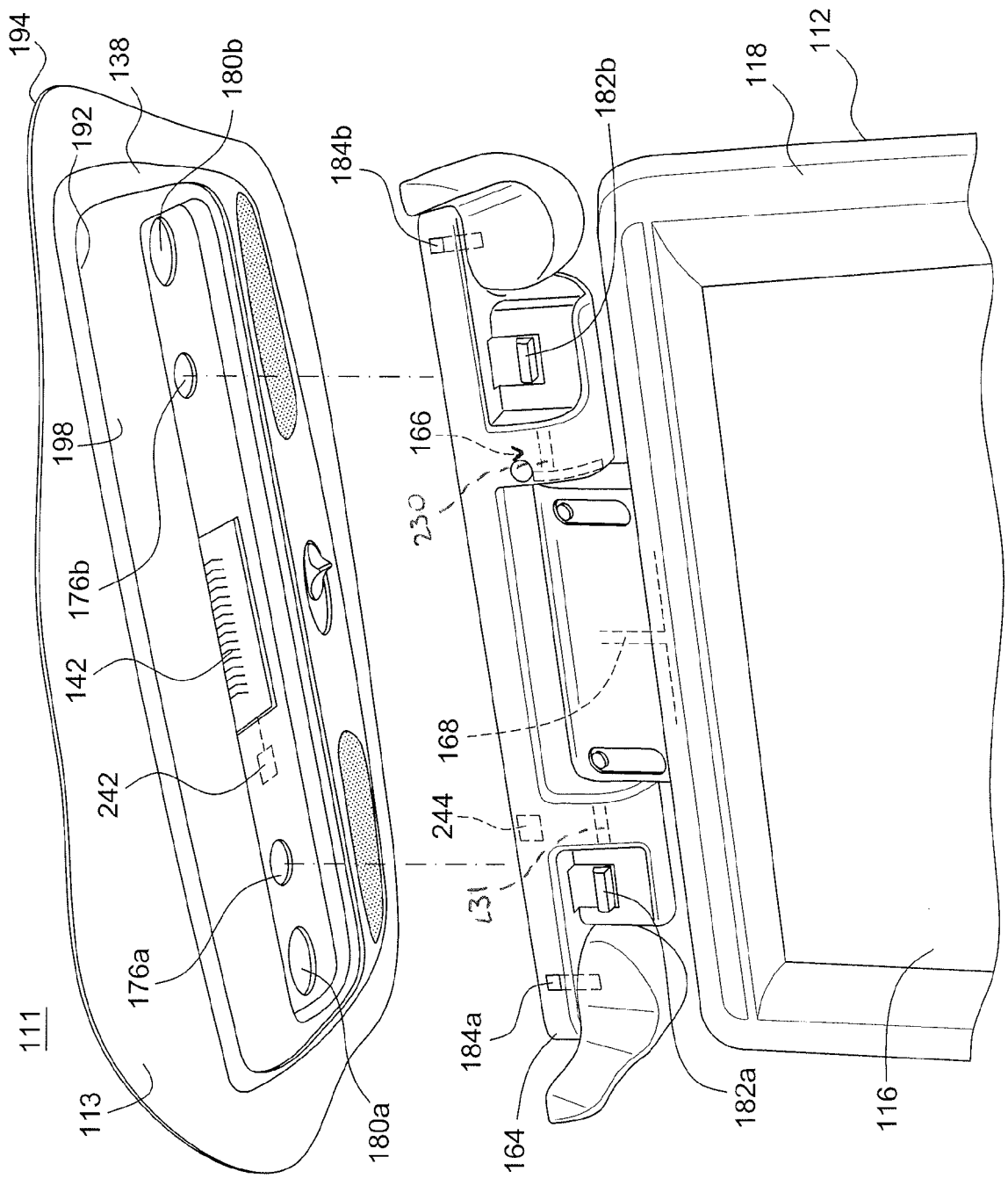
FIGS. 1, 2 and 3 show a video system employing an attachment mechanism for selective attachment to the ceiling of a vehicle.
Figure 2:
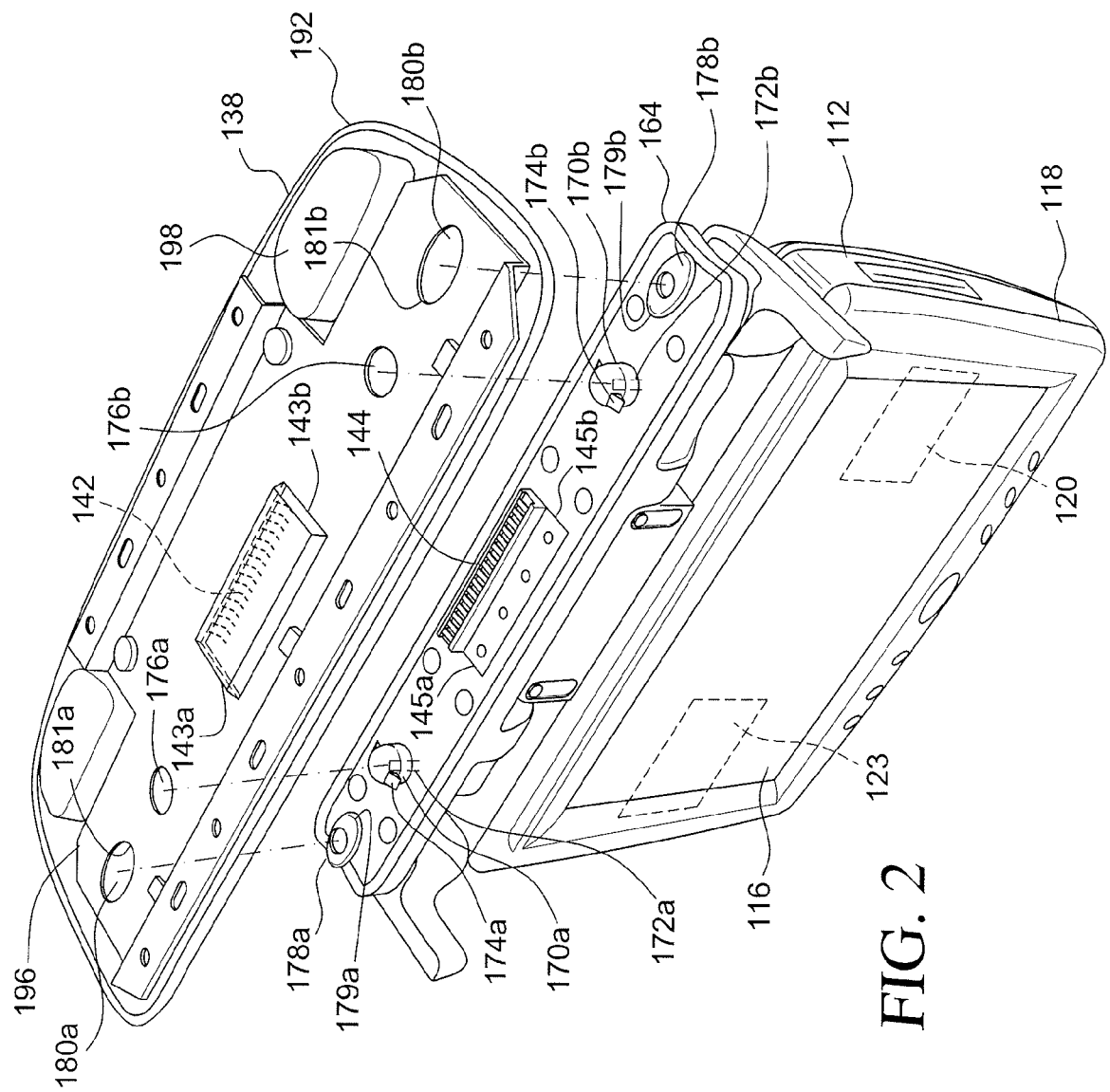
Figure 3:
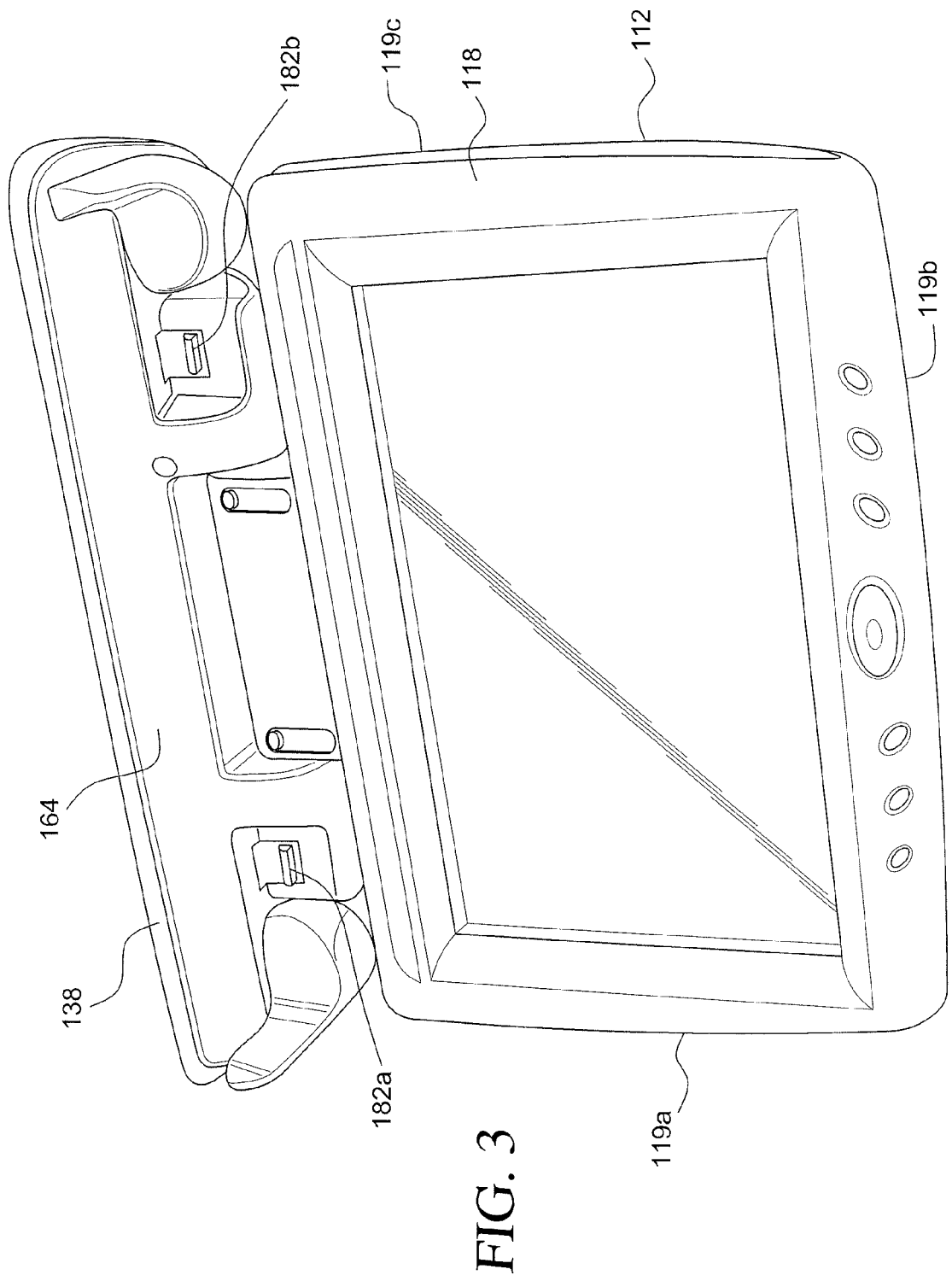

With reference to FIGS. 1, 2 and 3, and in accordance with a first embodiment of the present invention, an automobile entertainment system 110 is disclosed. The automobile entertainment system 110 is composed of a series of video and audio components integrated within an automobile 111. As those skilled in the art will certainly appreciate, the various embodiments of the present entertainment system are disclosed herein with reference to their use within an automobile. However, the entertainment system could certainly be used in other vehicles, for example, boats or planes, without departing from the spirit of the present invention.

Referring to FIGS. 1, 2 and 3, a video system 112 and mounting structure are disclosed. The video system 112 is adapted for selective mounting within the ceiling 113 of an automobile 111. It is further contemplated those skilled in the art will appreciate the concepts underlying the present invention provide for the possibility of selectively mounting the video system within a variety of locations within an automobile, for example, the dashboard of an automobile.

The video system 112 is detachably mounted within a cradle 138 secured to the ceiling 113 of an automobile 111. The video system 112 generally includes a video monitor 116 for presenting media content and a video source 120 integrated therewith.

In accordance with a preferred embodiment of the present invention, the video source is a DVD player coupled to the video monitor 116 for the transmission of video content thereto. The DVD player, or other video source 120, is integrated within the same video housing 118 as the video monitor 116. In addition to, or in place of, video source 120 it is also contemplated a hard drive video source 123 may be integrated with the video monitor 116. The hard drive 123 includes inputs for receiving video content and outputs for transmitting video content to the video monitor 116, both of which are well known to those skilled in the art. However, and as those skilled in the art will certainly appreciate, the video source may take a variety of other forms (for example, universal media disk) without departing from the spirit of the present invention.

The video monitor 116, DVD player 120, hard drive 123 and associated control components are mounted within the video housing 118. In accordance with a preferred embodiment, the video monitor 116 is a TFT LCD screen. However, it is contemplated other monitor constructions, for example, plasma, Ultra High Definition VGA, touch screen VGA, organic LED, fabric based monitors (e.g., flexible TFT) etc., may be used without departing from the spirit of the present invention.

With regard to the DVD player 120, it is integrally molded within the video housing 118 and positioned for insertion of the DVDs behind the video monitor 116. By mounting the DVD player 120 in this way, a stable structure is developed that is well adapted for the automobile environment. While the DVD player is disclosed as being a slot-loaded design with insertion behind the video monitor, the DVD player could take a variety of other forms without departing from the spirit of the present invention. Those skilled in the art will appreciate the various DVD designs that may be employed, for example, many can be seen in U.S. patent application Ser. No. 11/177,405, which is incorporated herein by reference.

Figure 4:
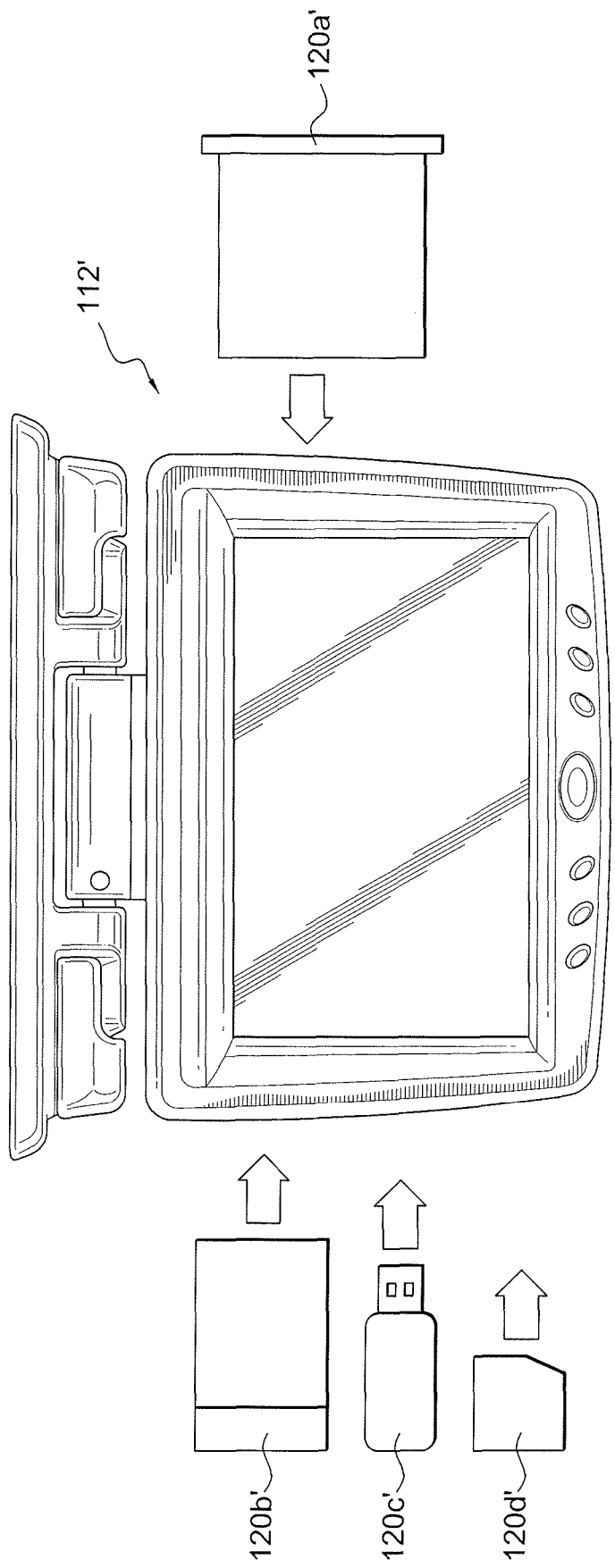
FIG. 4 is a front plan view of the video system in accordance with an alternate embodiment.

Referring to FIG. 4, an alternate modular video system 112' is disclosed. In accordance with this system, the various components are not hardwired but are incorporated within the video system 112' via interchangeable modules. For example, the video system 112' is provided with a removable and interchangeable module 120a' in which a hard disk drive, flash memory drive, DVD player/recorder, CD player/recorder, BluRay player/recorder, and an auxiliary battery may be incorporated. As those skilled in the art will certainly appreciate, other slot type modules are utilized within the electronics industry and these may also be incorporated into the video system 112'. For example, a slot for a PCMCIA Card and/or Ie:Cell.Air card 120b' for downloading materials may be incorporated. Similarly, memory cards 120c' and USB cards 120d' may be incorporated into the video system 112'.

The video system 112 is detachably mounted within a cradle 138 formed in or secured to the ceiling 113 of the automobile 111. The design of the video system 112 and cradle 138 allows for the creation of multiple cradles 138 within an automobile, permitting selective positioning of the video system 112 at the various cradle locations within the automobile 111.

Figure 8A:
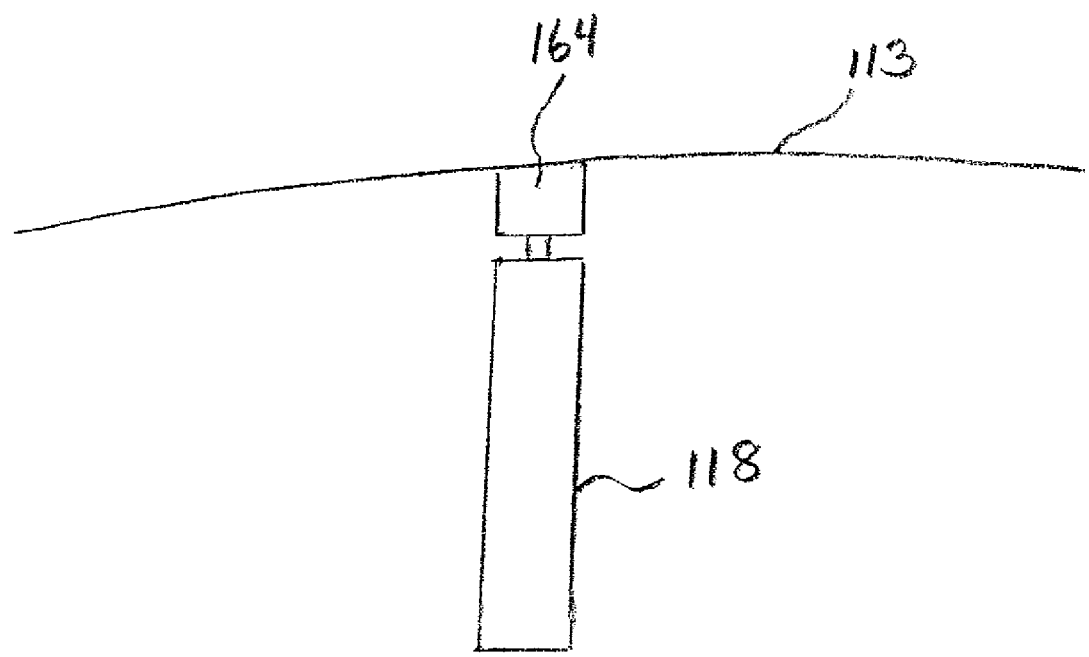
FIGS. 8A and 8B respectively show the video system in its use position and its storage position.
Figure 8B:
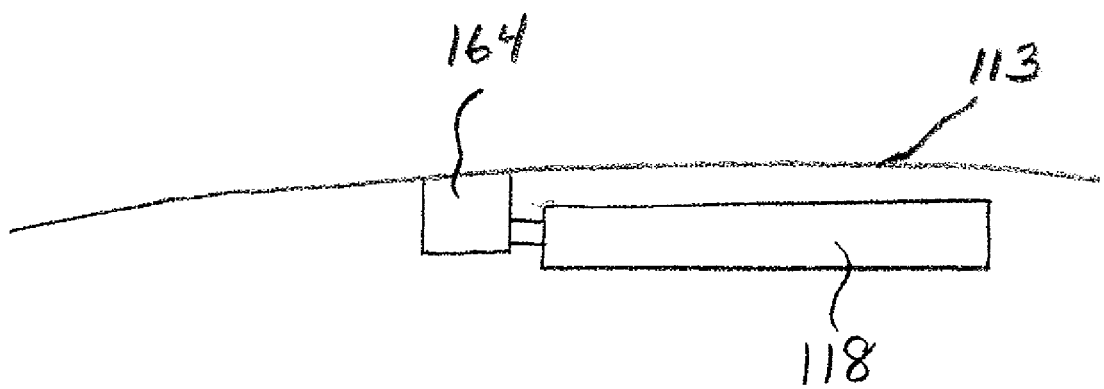

More particularly, the base 164 of the video system 112 is mounted to a cradle 138 formed within the ceiling 113 of the automobile 111 in a manner that permits rotation of the video housing 118 about multiple axes. The base 164 includes a first hinge 166 that facilitates rotation of the video housing 118 about an axis substantially parallel to the ceiling 113 of the automobile 111 for movement from its upward storage position (see, for example, FIG. 8B) to a downward use position (see, for example, FIG. 8A) for viewing thereof.

The base 164 further includes a second hinge 168 that permits rotation of the video housing 118 about an axis substantially perpendicular to the axis of the first hinge 166. As such, the second hinge 168 allows for rotation of the video housing 118 in a manner that facilitates viewing of the video monitor 116 from opposite sides of the automobile 111. The video system 112 is, therefore, designed for rotation about multiple axes and may be freely rotated to improve viewing regardless of where the video system 112 is being used.

Figure 5:
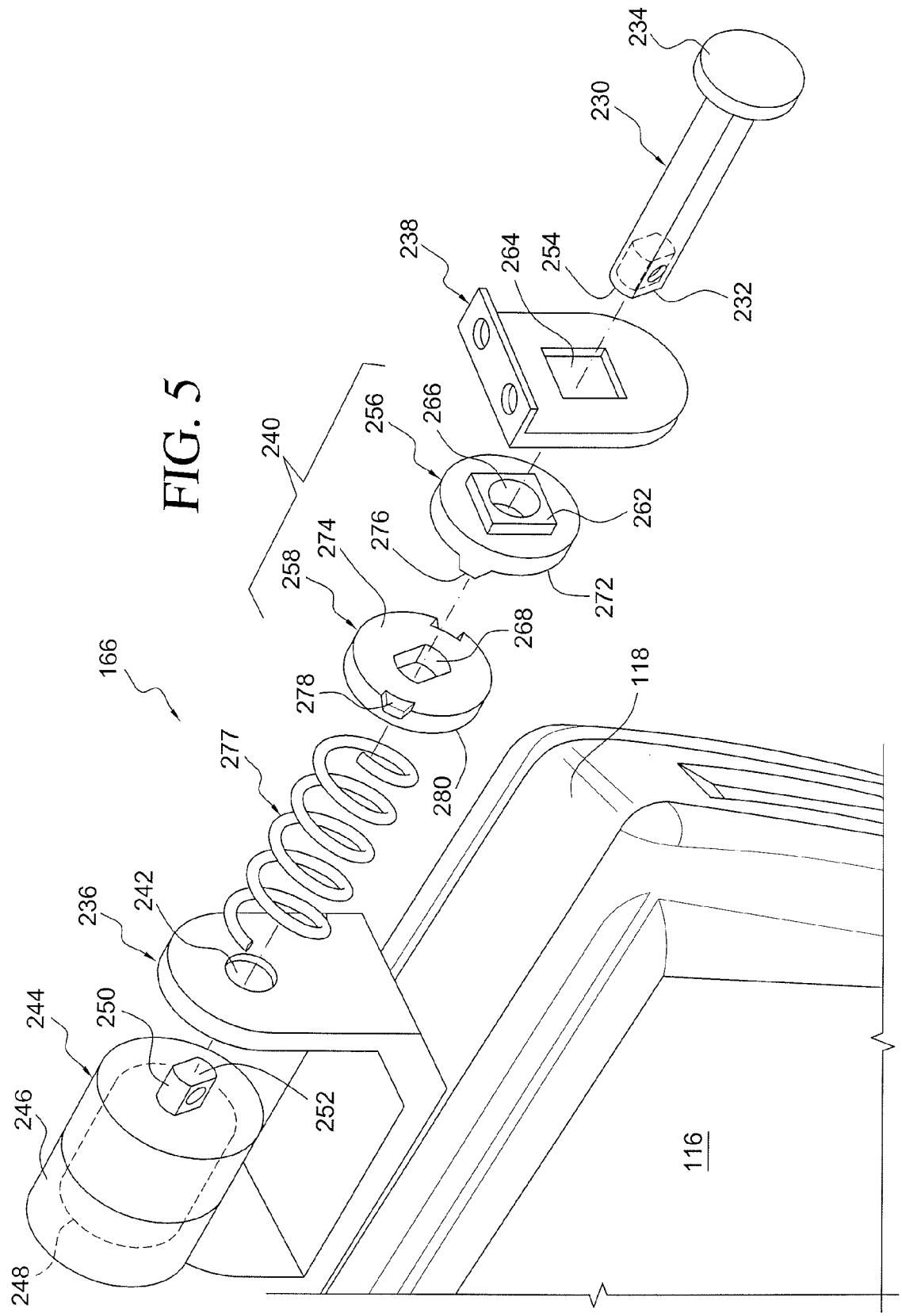
FIG. 5 is a detailed exploded view of the hinge structure employed in accordance with the present invention.
Figure 6:
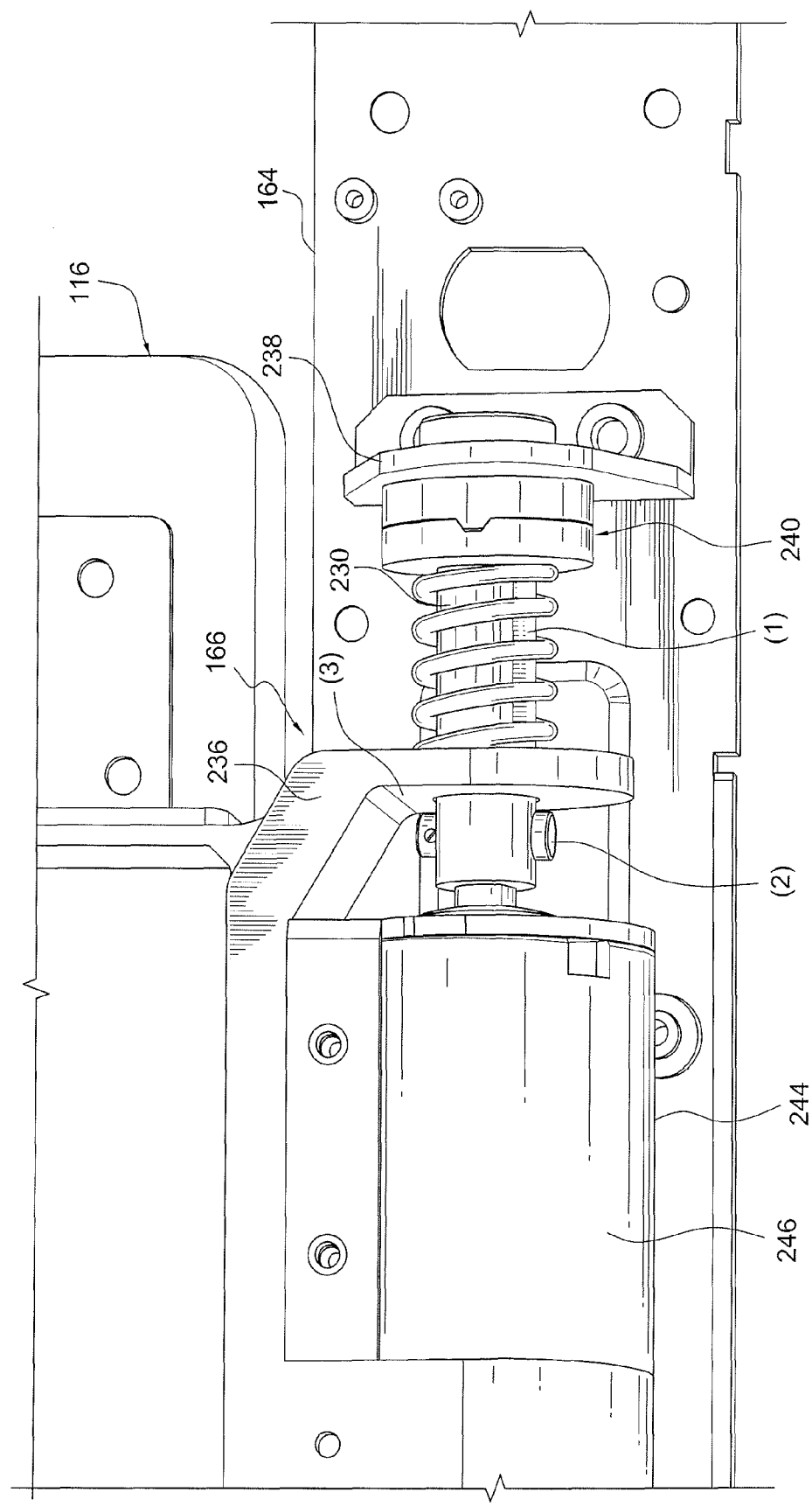
FIG. 6 is a detailed view of the hinge structure utilized in accordance with the present invention.

In accordance with a preferred embodiment, and with reference to FIGS. 5 to 7, the first hinge 166 is motorized to provide for controlled movement between its opened orientation for viewing of the video monitor 116 by those sitting in the backseats of the automobile and a closed orientation for storage of the video monitor 116 such that it faces the headliner of the automobile 111. More particularly, first hinge 166 includes a pivot pin 230 connecting the video housing 118 to the base 164. A secondary pivot pin 231 is also provided on the opposite side for connecting the housing 118 to the base 164. More particularly, the pivot pin 230 includes a first end 232 and a second end 234 and is shaped and dimensioned to extend between a mounting bracket 236 of the video housing 118 at a first end 232 thereof and a mounting bracket 238 of the base 164 at second end 234 thereof. The pivot pin 230 is fixedly coupled (that is, coupled in a manner substantially preventing rotational movement relative thereto) to the mounting bracket 238 of the base 164 via a break-away clutch assembly 240 as discussed below in greater detail. In this way, and as discussed below in greater detail, the second end 234 of the pivot pin 230 is held in a static position relative to the base 164 for preventing relative rotation between the base 164 and the pivot pin 230 such that rotation of the video housing 118 relative to the pivot pin 230, and ultimately the base 164, is permitted in a manner allowing for movement of the video housing 118 between its use position and its storage position.

As briefly mentioned above, the first end 232 of the pivot pin 230 is secured to the video housing 418. More particularly, the video housing 118 is provided with a mounting bracket 236 through which the first end 232 of the pivot pin 230 passes for supporting and mounting the video housing 118 in a pivoting relationship with the base 164. The mounting bracket 236 is provided with a bearing aperture 242 shaped and dimensioned to receive the first end 232 of the pivot pin 230 in a manner permitting rotation of the mounting bracket 236 relative to the pivot pin 230.

A drive motor assembly 244 is mounted within the video housing 118. The drive motor assembly 244 includes a housing 246 in which a motor 248 is supported for moving the video housing 118 relative to the base 164. The motor 248 includes a drive shaft 250 having a distal end 252. The distal end 252 of the drive shaft 250 is secured to the distal tip 254 at the first end 232 of the pivot pin 230. In this way, rotational motion imparted by the drive motor assembly 244 is transfer to the video housing 118. Because the pivot pin 230 is fixedly connected to the base 164 at the second end 234 thereof, rotationally connected to the video housing 118, and the motor 248 is fixedly connected to the video housing 118, rotation of the drive shaft 250 will cause rotational motion of the video housing 118 relative to the base 164. When this rotational movement is transmitted by the driver motor assembly 244 in opposite directions, the video housing 118 is moved between its storage position and its use position.

In the event inadvertent and/or undesirable pressure is applied to the monitor housing that would otherwise damage the video system, a break-away clutch assembly 240 is provided to allow for rotation between the base 164 and the video housing 118. As briefly discussed above, the break-away clutch assembly 240 includes a base clutch member 256 fixedly connected to the mounting bracket 238 of the base 164 and monitor clutch member 258 fixedly connected to the pivot pin 230 and the drive shaft 250 of the motor 248. The base clutch member 256 is fixedly connected to the mounting bracket 238 of the base 164 by a square projection 262 that seats within a square aperture 264 formed in the mounting bracket 238. As such, when the square projection 262 is seated with the square aperture 264, the base clutch member 256 is prevented from rotation relative to the mounting bracket 238 and the base 164. The base clutch member 256 also includes a circular bearing aperture 266 shaped and dimensioned for the passage of the pivot pin 230 therethrough in a manner allowing for free rotation of the pivot pin 230 relative thereto.

The monitor clutch member 258, which is selectively, fixedly connected to the base clutch member 256 in a manner discussed below in greater detail, includes a square shaped aperture 268 shape and dimensioned for passage of the pivot pin 230 therethrough in a manner which locks the monitor clutch member 258 to the pivot pin 230 for rotation therewith. In this way, and when the video system 112 is operating in its normal manner via the drive motor assembly 244, the second end of the pivot pin 230 is substantially fixed to the mounting bracket 238 of the base 164 in a manner allowing for controlled opening and closing of the video housing 118 as discussed above.

The provision of selective, fixed coupling between the base clutch member 256 and the monitor clutch member 258 is achieved because the base clutch member 256 and the monitor clutch member 258 include respective facing surfaces 272, 274 with mating engagement members 276, 278. The engagement members 276, 278 are shaped and dimensioned to substantially prevent rotation of the base clutch member 256 relative to the monitor clutch member 258 will permitting relative motion upon the application of the threshold force as described below in great detail. The facing surfaces 272, 274 of the base clutch member 256 and monitor clutch member 258 are biased in a facing relation by a spring 277 which acts upon an outer surface 280 of the monitor clutch member 258 forcing the facing surface 274 of the monitor clutch member 258 into engagement with the facing surface 272 of the base clutch member 256.

As a result, and as discussed above, during normal operation, the rotation of the motor 248 and ultimately the drive shaft 250 will cause the video housing 118 to rotate relative to the base 164 because the pivot pin 230 is fixedly secured to the base 164 via the interaction of the pivot pin with the monitor clutch member 258 that is held in a fixed relationship with the mounting bracket 238 of the base 164 via the spring 277 biasing the facing surfaces 272, 274 of the base clutch member 256 and the monitor clutch member 258 into engagement with the engagement members 276, 278 thereof preventing the monitor clutch member 258 from rotation relative to the base clutch member 256. However, when accidental pressure is applied to the video housing 148, the pressure is transmitted along the pivot pin 230 and to the monitor clutch member 258 causing the facing surface 274 of the monitor clutch member 258 to move out of engagement with the base clutch member 256 and permitting free movement of the video housing 118 relative to the base 164. Once the accidentally applied pressure is removed, on may quickly and easily place the video system 112 back into use by rotating the video housing 118 until the engagement members 176, 178 of the base clutch member 256 and the monitor clutch member 258 seat once again in a mating relationship with the facing surfaces 272, 274 of the respective base clutch member 256 and monitor clutch member 258 in a fixed relationship.

The base 164 further includes a projecting attachment member 170 permitting selective coupling of the video system 112 within the automobile 111. The attachment member 170 includes a fastening mechanism 171 that permits secure and convenient attachment/removal of the video system 112 from the cradle 138. More particularly, and with reference to FIGS. 1, 2 and 3, the base 164 includes first and second projecting attachment members 170a, 170b shaped and dimensioned to engage respective first and second apertures 176a, 176b formed in the cradle 138. The first and second projecting attachment members 170a, 170b each include an upwardly extending post 172a, 172b with a resilient spring latch 174a, 174b formed thereon. As will be discussed below in greater detail, the spring latches 174a, 174b are actuated to control passage through the respective first and second apertures 176a, 176b during installation and removal.

As those skilled in the art will certainly appreciate, the first and second projecting attachment members 170a, 170b will only provide limited support. As such, the video system 112 is provided with eccentric shaped first and second locking members 178a, 178b and the cradle 138 is similarly provided with eccentric shaped first and second locking apertures 180a, 180b. The first and second locking members 178a, 178b are shaped to pass through respective first and second locking apertures 180a, 180b formed in the cradle when the shapes of the first and second locking members 178a, 178b and the first and second locking apertures 180a, 180b align. Once the first and second locking members 178a, 178b are passed through the first and second locking apertures 180a, 180b, the first and second locking members 178a, 178b are rotated such that the shape of the first and second locking members 178a, 178b no longer align with the first and second locking apertures 180a, 180b, and the video system 112 is thereby locked relative to the cradle 138.

As with the prior embodiment, and referring to FIGS. 1, 2 and 3, the attachment mechanism is further enhanced with first and second safety buttons 182a, 182b associated with the first and second projecting attachment members 170a, 170b. The first and second safety buttons 182a, 182b respectively control actuation of the spring latches 174a, 174b extending from the projecting attachment members 170a, 170b so that the video system 112 may not be removed until the respective safety buttons 182a, 182b are simultaneously actuated. In particular, the first and second safety buttons 182a, 182b cause controlled expansion and/or contraction of the spring latches 174a, 174b to permit or restrict passage of the spring latches 174a, 174b through the first and second apertures 176a, 176b. In accordance with a preferred embodiment, the safety buttons 182a, 182b control expansion and/or contraction of the spring latches 174a, 174b by selectively drawing the spring latches 174a, 174b inward in a manner making them narrower, and thereby allowing for passage through the first and second apertures 176a, 176b. When the safety buttons 182a, 182b are not actuated the spring latches 174a, 174b extend outwardly in a manner preventing passage of the spring latches 174a, 174b through the first and second apertures 176a, 176b. Although a preferred technique is disclosed herein, other techniques could certainly be employed without departing from the spirit of the present invention.

In accordance with yet a further embodiment of the present invention, and with reference to FIG. 1, third and fourth safety buttons 184a, 184b are associated with the first and second locking members 178a, 178b and prevent rotation of the first and second locking members 178a, 178b until the first and second safety buttons 184a, 184b are simultaneously actuated. This embodiment also includes a tensioning mechanism 212 with a handle friction plate 212a and handle 212b. Although the various embodiments for the safety buttons are shown in a single figure, those skilled in the art will appreciate they may be used together or separately without departing from the spirit of the present invention.

The cradle 138 utilized in accordance with a preferred embodiment of the present invention includes quick release electrical connections 142 for the audio input 122, audio output 124, video input 126, video output 128 and power supply 130 (although one embodiment contemplates a system which connects only to a power supply). The video system 112, and particularly, the base 164 of the video system 112, includes mating electrical connections 144 for transmitting electricity and A/V signals between the cradle 138 and the video system 112. In particular, when the video system 112 is mounted upon the cradle 138, the respective electrical connections 142, 144 mate to provide for the transmission of power and A/V signals between the video system 112 and the cradle 138. As those skilled in the art will certainly appreciate, other readily removable electrical connections for other purposes may also be supplied.

The usefulness of the present embodiment is enhanced by the fact the cradle 138 is substantially recessed within the ceiling 113 of the automobile 111. More particularly, each cradle 138 installed with an automobile 111 is positioned such that the face plate 192 is substantially flush with the headliner 194, or other automobile surface, directly adjacent thereto. With this in mind, the cradle 138 is constructed with a mounting plate 196 directly secured to the ceiling 113 of the automobile 111 and a ceiling docking port 198 secured thereto. In accordance with a preferred embodiment, the face place 192 is formed as part of the ceiling docking port 198.

The ceiling docking port 198 includes the electrical and mechanical components discussed above which allow for the direct attachment of the video system 112 thereto.

More particularly, and as will be discussed below in greater detail, the cradle is preferably secured to a lateral beam running along the roof of the automobile. With this in mind, the orientation of the fastening mechanism components is critical to the operation and installation of the present video system. More particularly, the base 164 of the video system includes first and second projecting attachment members 170a, 170b shaped and dimensioned to engage respective first and second apertures 176a, 176b formed in the cradle 138. The base 164 of the video system 112 also includes eccentric shaped first and second locking members 178a, 178b and the cradle 138 is similarly provided with eccentric shaped first and second locking apertures 180a, 180b. Between the respective attachment members, locking members and apertures are electrical connections, which are discussed below in greater detail, linking the video system to the cradle (and the remainder of the automobile).

Figure 9:
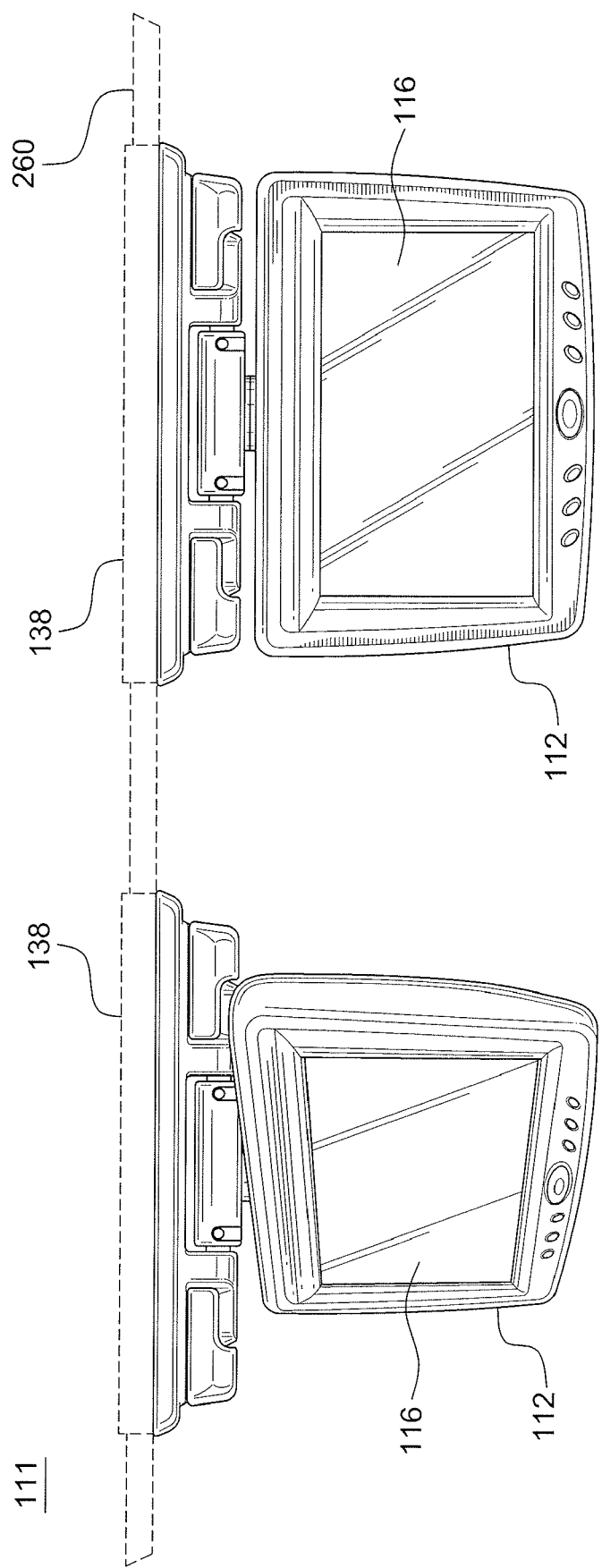
FIG. 9 is an embodiment employing first and second video systems in accordance with the present invention.

The spacing of the various fastening components relative to the electrical connections 142, 144 is critical to placement of the cradle 138, and ultimately the video system 112, along the beams, for example, the B-pillar 260 (see FIG. 9), formed in the roof of an automobile. With this in mind, the inner edge 181a, 181b, 179a, 179b of the outer most fastening component, for example, the respective inner edges 181a, 181b of the locking apertures 180a, 180b or the respective inner edges 179a, 179b of the locking members 178a, 178b, is preferably approximately ⅛ inch to approximately 7 inches from the respective outer edge 143a, 143b, 145a, 145b of the electrical connection 142, 144, and more preferably approximately 2 inches to approximately 4 inches from the outer edge 143a, 143b, 145a, 145b of the electrical connection 142, 144. It should be understand these distances are from adjacent fastening components to the outer edge of the electrical components. As such, and more particularly in accordance with a preferred embodiment, the respective inner edges 181a, 181b of the first and second locking apertures 180a, 180b are preferably approximately ⅛ inch to approximately 7 inches from the respective first and second outer edges 143a, 143b of the electrical connections 142, and more preferably approximately 2 inches to approximately 4 inches from the respective first and second outer edges 143a, 143b of the electrical connections 142. Similarly, the respective inner edges 179a, 179b of the locking members 178a, 178b are preferably approximately ⅛ inch to approximately 7 inches from the respective first and second outer edges 145a, 145b of the electrical connection 144, and more preferably approximately 2 inches to approximately 4 inches from the respective first and second outer edges 145a, 145b of the electrical connection 144.

Although the cradle 138 is shaped and dimensioned for receiving and securing the video system 112 to the ceiling of the automobile, those skilled in the art will certainly appreciate similar cradles may be provided at other locations permitting use of the video system 112 at other remote locations.

With this in mind, and with reference to U.S. patent application Ser. No. 11/453,264, which is incorporated herein by reference, various cradles may be mounted within an automobile for receiving video systems m a manner permitting viewing from different locations within the automobile and multiple monitor systems may be implemented.

In addition to the electrical connections provided on the cradle 138, and as was discussed above, the cradle 138 also includes a various fastening apertures 176a, 176b, 180a, 180b adapted for selective engagement with the attachment members 170a, 170b, 178a, 178b of video system 112.

The installation of the cradle 138 is intended to provide for an aesthetically pleasing appearance and the ceiling docking port 198 is, therefore, provided with a face plate 192 which substantially aligns with and is, therefore, flush with the headliner 194 of the automobile 111. With this in mind, the following disclosure applies to both embodiments of the video system presented above, although only the first embodiment shown in FIGS. 1 to 4 is referenced herein. Aesthetics are further enhanced by the provision of a cover member as disclosed with reference to U.S. patent application Ser. No. 11/453,264, which is incorporated herein by reference, which may be selectively placed over the ceiling docking port 198 when it is not in use.

The aesthetically pleasing nature of the present embodiment is further enhanced by the provision of a "free floating" video system 112. More particularly, and as discussed above when describing the various embodiments of the present video system 112, the video housing 118 with the video monitor 116 and video source 120 housed therein depends from the base 164 which is then mounted to the recessed cradle 138 formed within the ceiling of the automobile. As such, the video system 112 depends from the ceiling integrated cradle 138 without the need for a surrounding support structure, allowing for the provision of a self-sufficient video system 112. More particularly, when the video system 112 is rotated to its storage position, it is substantially parallel and adjacent the headliner 194 with no support structure surrounding the unattached outer perimeter, that is, the free side edges 119a-c to which the base 164 is not attached, of the video housing 118. This improves the aesthetics of the video system 112 and does not require that a substantial portion of the headliner 194 be covered or cut away to accommodate the installation thereof.

Figure 10:
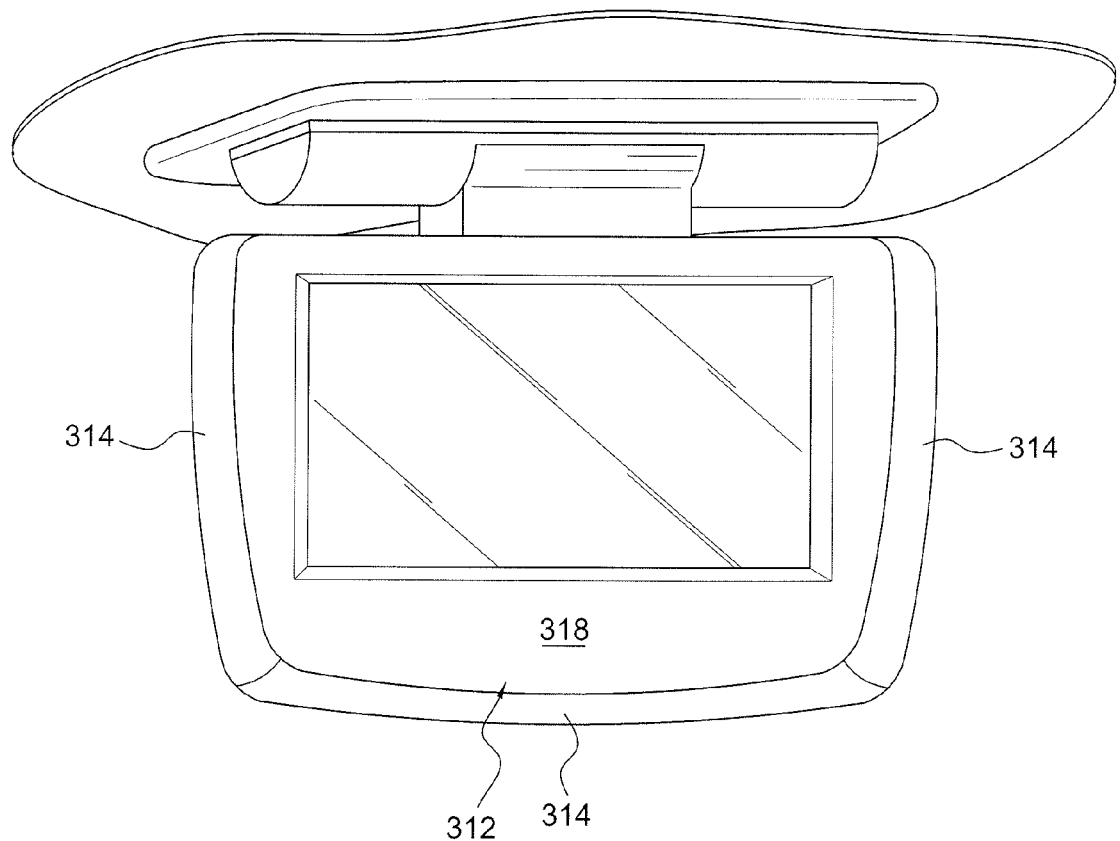
FIGS. 10 and 11 are perspective views of the video system with profile members secured thereto.
Figure 11:
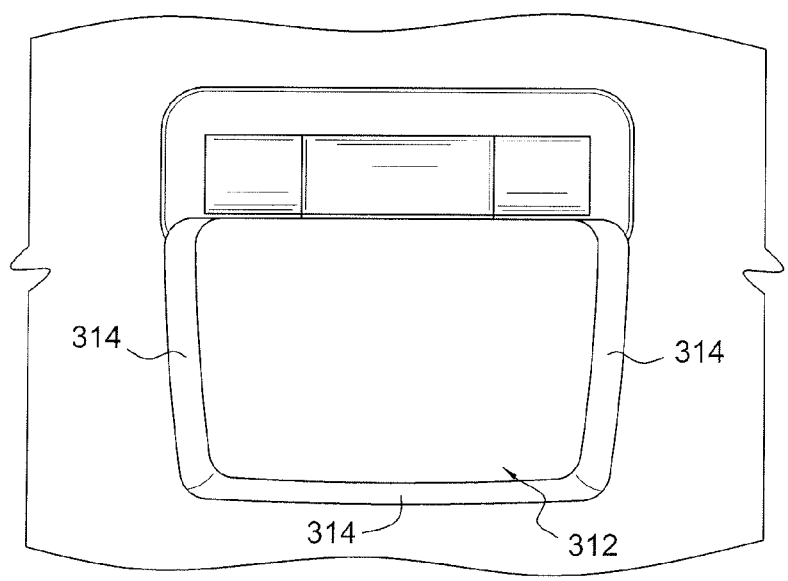
Figure 12:
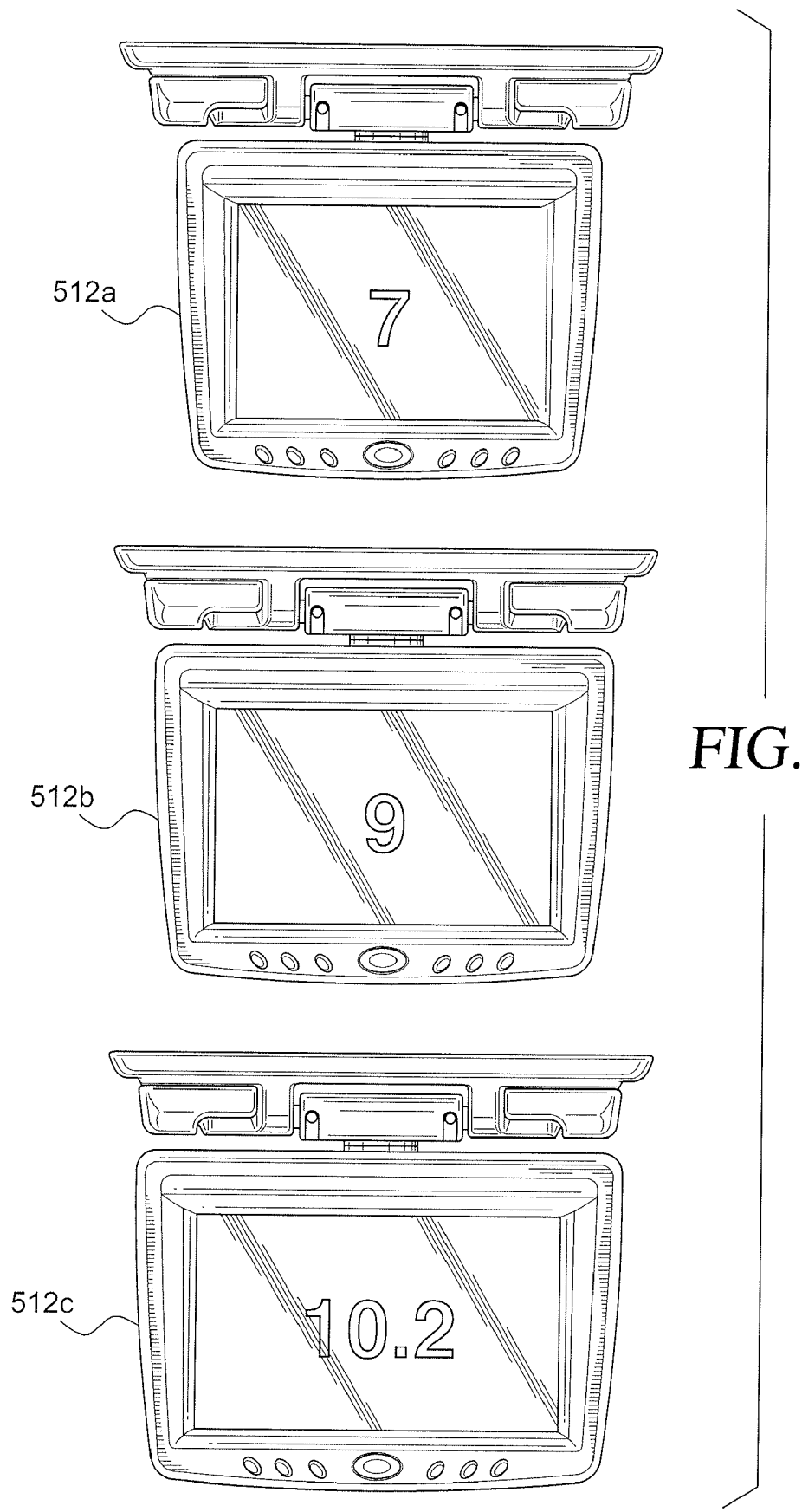
FIG. 12 shows various video monitors of different sizes which may be selectively used in accordance with the present invention.

Referring to FIGS. 10 and 11, the "free floating" video system 312 of the present invention is further enhanced by providing selectively attachable profile members 314 as disclosed with reference to U.S. patent application Ser. No. 11/453,264, which is incorporated herein by reference In addition to the aesthetically pleasing nature of a "free floating" video system, the fact that no support structure surrounds the video system allows for the ready replacement of the video system with other video systems 512a, 512b, 512c of differing sizes and shapes (see FIG. 12). As such, a driver may choose to use various different video systems of different sizes depending upon the needs of the driver. Similarly, a dealer or installer can sell the same system at different prices depending upon the size of the monitor required by the customer.

As a user replaces the present video system 512 with a larger video system, it might be found that the larger video system 512 blocks the driver's view as he or she looks through the rearview mirror 502 of the automobile 511. With this in mind, the video system 512 is provided with a rearwardly facing video camera as disclosed with reference to U.S. patent application Ser. No. 11/453,264, which is incorporated herein by reference.

The cables 132 extend through the ceiling 113 and the cradle 138. These cables 132 ultimately link audio, video and power to the cradle 138 and video system 112. More specifically, the cradle 138 and video system 112 are electrically connected to the remainder of the automobile 111 via electrical communication lines in a manner known to those skilled in the art.

Specific wiring arrangements and linking of various video systems within an automobile in accordance with preferred embodiments of the present invention are disclosed in U.S. patent application Ser. No. 10/920,425, entitled "AUTOMOBILE ENTERTAINMENT SYSTEM", filed Aug. 18, 2004, which is incorporated herein by reference, U.S. patent application Ser. No. 10/895,111, entitled "AUTOMOBILE ENTERTAINMENT SYSTEM", filed Jul. 21, 2004, which is incorporated herein by reference, U.S. patent application Ser. No. 10/895,110, entitled "AUTOMOBILE ENTERTAINMENT SYSTEM LINKING MULTIPLE VIDEO SYSTEM FOR COORDINATED SHARING OF VIDEO CONTENT", filed Jul. 21, 2004, which is incorporated herein by reference, U.S. patent application Ser. No. 10/895,086, entitled "HOUSING FOR AN AUTOMOBILE ENTERTAINMENT SYSTEM", filed Jul. 21, 2004, which is incorporated herein by reference, U.S. patent application Ser. No. 10/895,099, entitled "INSTALLATION APPARATUS FOR AN AUTOMOBILE ENTERTAINMENT SYSTEM", filed Jul. 21, 2004, which is incorporated herein by reference, U.S. patent application Ser. No. 10/920,431, entitled "AUTOMOBILE ENTERTAINMENT SYSTEM", filed Aug. 18, 2004, which is incorporated herein by reference, and U.S. patent application Ser. No. 10/920,430, entitled "AUTOMOBILE ENTERTAINMENT SYSTEM", filed Aug. 18, 2004, which is incorporated herein by reference.

The present video system 112 is provided with the ability to offer a variety of functionalities. These functionalities may be hardwired or programmed within the video system 112 or the functionalities may be added in a modular manner via an expansion slot 140 provided within the video system 112. Contemplated functionalities include, but are not limited to satellite radio (for example, Serius, XM), Pictel phone, satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, USB capabilities, Blue sphere, Blu-ray technology, hot swap hard drive, satellite video import card, wireless video import card, supplemental hard drive, flash memory accessibility, wireless download capabilities, PCICM slots, etc.

As the present video system 112 is designed for use at a variety of locations and potentially at locations remote from a cradle, the video system 112 is provided with a battery 220. The battery 220 is preferably a rechargeable battery and, as such, will be regularly recharged when the video system 112 is mounted within the cradle 138 and coupled to the power supply running therethrough.

Figure 13:
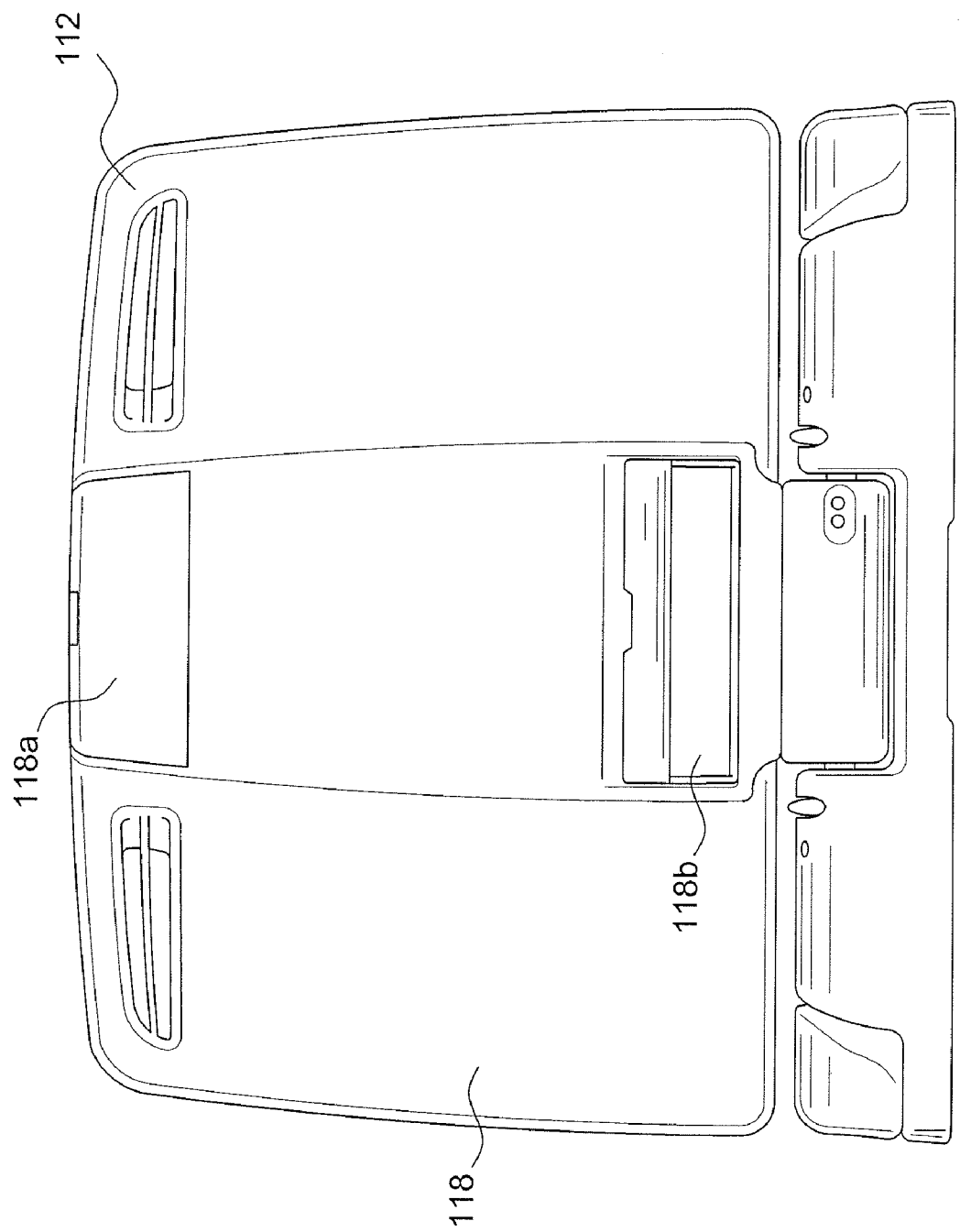
FIG. 13 shows a rear view of the video system in accordance with the present invention.

As shown best with reference to the video system 112 as shown in FIG. 13, enhanced usage is further provided by the inclusion of USB ports, flash memory slots, cellular card slots, IR transmitters, RCA ports, power buttons or other a/v input/outputs, formed within the video housing 118 of the video system 112 and contained behind cover 118a, 118b which may be selectively opened to reveal the ports and slots. The inclusion of these ports allows for ready attachment of the present video system to other remote a/v sources (for example, game consoles, portable digital music players, etc.). It is also contemplated such ports, slots and other accessories may be integrated with the cradle.

In addition, a broadcast television receiver and antenna may be integrated with the video monitor as discussed in U.S. patent application Ser. No. 11/177,405, which is incorporated herein by reference.

Control of the video system 112, including the video monitor 116, DVD player 120, hard drive 123 and other components of the video system 112, is facilitated by the provision of control buttons along the outer surface of the video system 112. In accordance with a preferred embodiment of the present invention, the control buttons take the form of a multifunction controller 160 permitting movement of a cursor shown upon various interfaces displayed upon the video in a well known manner. In addition, conventional control buttons 162 may also be provided for control of traditional functions. In addition to the provision of manual control buttons 162, the video system 112 may further include a remote control (not shown) such that an individual need not actually touch the video system 112 to control the video system 112.

In view of the wide range of functionalities offered in accordance with the present invention, the video monitor may be supplemented with the use of Sharp's dual screen monitor technology. In this way, one may view one video content when looking at the monitor from one angle and view another video content when viewing the video monitor from another angle. Sharp's dual screen technology provides for the simultaneously display of different information and image content in right and left views in a single unit by directionally controlling the viewing angle of the LCD. This feature makes it possible to provide information and content tailored to specific users depending on the angle at which they view the screen. Using a number of technologies, such as a parallax barrier superimposed on an ordinary TFT LCD, the LCD sends the light from the backlight into right and left directions, making it possible to show different information and visual content on the same screen at the same time depending on the viewing angle. Controlling the viewing angle in this way allows the information or visual content to be tailored to multiple users viewing the same screen. For example, one user can view the display as a PC screen for browsing the Internet or for editing video shot using a digital camera (IT while at the same time another user watches video content such as a movie or a TV broadcast (A/V).

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A video system for selective mounting within a cradle secured to a ceiling of an automobile, comprising:
   a video housing in which a video monitor and a video source are mounted;
   a base secured to the video housing in a manner that permits rotation of the video housing,
   the video housing includes a mounting bracket and the base includes a mounting bracket for use in pivotally coupling the video housing to the base;
   a motorized first hinge connecting the base to the video housing for facilitating pivotal movement between the video housing and the base between a use position and a storage position, the first hinge includes a pivot pin having a first end and a second end and extends between, and is coupled to, the mounting bracket of the video housing and the mounting bracket of the base, the second end of the pivot pin is fixedly coupled to the mounting bracket of the base, wherein the second end of the pivot pin is fixedly coupled to the mounting bracket of the base via a break-away clutch assembly; and
   a drive motor assembly is mounted to the video housing, the drive motor assembly includes a drive shaft having a distal end, the distal end of the drive shaft is secured to a distal tip at the first end of the pivot pin permitting rotational motion to be imparted by the drive motor assembly to be transferred to the video housing.

2. The video system according to claim 1, wherein the break-away clutch assembly includes a base clutch member fixedly connected to the mounting bracket of the base and a monitor clutch member fixedly connected to the pivot pin and the drive shaft of the motor.

3. The video system according to claim 2, wherein the base clutch member is fixedly connected to the mounting bracket of the base by a projection that seats within an aperture formed in the mounting bracket, such that when the projection is seated with the aperture the base clutch member is prevented from rotation relative to the mounting bracket and the base.

4. The video system according to claim 2, wherein the base clutch member also includes a circular bearing aperture shaped and dimensioned for the passage of the pivot pin therethrough in a manner allowing for free rotation of the pivot pin relative thereto.

5. The video system according to claim 2, wherein the monitor clutch member, which is selectively, fixedly connected to the base clutch member, includes an aperture shaped and dimensioned for passage of the pivot pin therethrough in a manner which locks the monitor clutch member to the pivot pin for rotation therewith.

6. The video system according to claim 1, wherein the drive motor assembly includes a housing in which a motor is supported for moving the video housing relative to the base, the motor includes the drive shaft.

7. The video system according to claim 2, further comprising a spring, wherein a force applied by the spring to an outer surface of the monitor clutch member forces a facing surface of the monitor clutch member into engagement with a facing surface of the base clutch member.

8. The video system according to claim 1, further comprising:
   first and second projecting attachment members disposed on the base and configured to engage first and second apertures formed in the cradle, respectively; and
   first and second safety buttons disposed on the base and configured to disengage the first and second projecting attachment members from the first and second apertures formed in the cradle, respectively.

9. A video system for selective mounting within a cradle secured to a ceiling of an automobile, comprising:
   a video housing in which a video monitor and a video source are mounted;
   a base secured to the video housing in a manner that permits rotation of the video housing,
   the video housing includes a mounting bracket and the base includes a mounting bracket for use in pivotally coupling the video housing to the base;
   a motorized first hinge connecting the base to the video housing for facilitating pivotal movement between the video housing and the base between a use position and a storage position, the first hinge includes a pivot pin having a first end and a second end and extends between, and is coupled to, the mounting bracket of the video housing and the mounting bracket of the base, the second end of the pivot pin is fixedly coupled to the mounting bracket of the base; and
   a drive motor assembly is mounted to the video housing, the drive motor assembly includes a drive shaft having a distal end, the distal end of the drive shaft is secured directly to a distal tip at the first end of the pivot pin permitting rotational motion to be imparted by the drive motor assembly to be transferred to the video housing.

10. The video system according to claim 9, wherein the drive motor assembly includes a housing in which a motor is supported for moving the video housing relative to the base, the motor includes the drive shaft.

11. The video system according to claim 10, wherein the pivot pin is fixedly coupled to the mounting bracket of the base via a break-away clutch assembly.

12. The video system according to claim 11, wherein the break-away clutch assembly includes a base clutch member fixedly connected to the mounting bracket of the base and a monitor clutch member fixedly connected to the pivot pin and the drive shaft of the motor.

13. The video system according to claim 12, wherein the base clutch member is fixedly connected to the mounting bracket of the base by a projection that seats within an aperture formed in the mounting bracket, such that when the projection is seated with the aperture the base clutch member is prevented from rotation relative to the mounting bracket and the base.

14. The video system according to claim 12, wherein the base clutch member also includes a circular bearing aperture shaped and dimensioned for the passage of the pivot pin therethrough in a manner allowing for free rotation of the pivot pin relative thereto.

15. The video system according to claim 12, wherein the monitor clutch member, which is selectively, fixedly connected to the base clutch member, includes an aperture shaped and dimensioned for passage of the pivot pin therethrough in a manner which locks the monitor clutch member to the pivot pin for rotation therewith.

16. The video system according to claim 12, further comprising a spring, wherein a force applied by the spring to an outer surface of the monitor clutch member forces a facing surface of the monitor clutch member into engagement with a facing surface of the base clutch member.

17. The video system according to claim 9, further comprising:
first and second projecting attachment members disposed on the base and configured to engage first and second apertures formed in the cradle, respectively; and
first and second safety buttons disposed on the base and configured to disengage the first and second projecting attachment members from the first and second apertures formed in the cradle, respectively.

* * * * *